United States Patent
Matsuzawa

(10) Patent No.: US 9,691,420 B2
(45) Date of Patent: Jun. 27, 2017

(54) DISC DEVICE, CONTROLLING DEVICE AND METHOD

(71) Applicant: Kabushiki Kaisha Toshiba, Minato-ku, Tokyo (JP)

(72) Inventor: Takuji Matsuzawa, Kashiwa Chiba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 130 days.

(21) Appl. No.: 14/600,790

(22) Filed: Mar. 30, 2015

(65) Prior Publication Data

US 2016/0064021 A1    Mar. 3, 2016

Related U.S. Application Data

(60) Provisional application No. 62/043,191, filed on Aug. 28, 2014.

(51) Int. Cl.
 *G11B 5/596* (2006.01)
 *G11B 20/10* (2006.01)

(52) U.S. Cl.
 CPC ...... *G11B 5/59622* (2013.01); *G11B 5/59627* (2013.01); *G11B 5/59694* (2013.01); *G11B 20/10009* (2013.01)

(58) Field of Classification Search
 CPC ........ G11B 5/59622–5/59627; G11B 5/59694; G11B 20/10009
 USPC ...................................... 360/77.04
 See application file for complete search history.

(56) References Cited

U.S. PATENT DOCUMENTS

| | | | | |
|---|---|---|---|---|
| 6,636,376 B1 | 10/2003 | Ho | | |
| 6,710,965 B2 * | 3/2004 | Ding | ............ | G11B 5/5556 360/77.02 |
| 6,768,607 B2 * | 7/2004 | Ottesen | ............ | G11B 5/59627 360/77.02 |
| 6,831,804 B2 * | 12/2004 | Ooi | ............ | G11B 5/59627 360/77.07 |
| 7,031,096 B2 * | 4/2006 | Kisaka | ............ | G11B 5/59622 360/77.04 |
| 7,035,037 B2 * | 4/2006 | Tao | ............ | G11B 5/59627 360/77.04 |
| 7,280,304 B2 * | 10/2007 | Wu | ............ | G11B 5/59627 360/75 |
| 7,317,591 B2 * | 1/2008 | Kisaka | ............ | G11B 5/59627 360/77.08 |
| 7,394,609 B2 * | 7/2008 | Atsumi | ............ | G11B 5/5547 360/75 |
| 7,564,644 B2 * | 7/2009 | Kim | ............ | G11B 5/59627 360/78.14 |
| 7,719,787 B2 * | 5/2010 | Harmer | ............ | G11B 5/59627 360/75 |
| 7,859,787 B2 * | 12/2010 | Kisaka | ............ | G11B 5/59627 360/77.04 |
| 7,933,091 B2 * | 4/2011 | Uchida | ............ | G11B 5/5582 360/77.04 |

(Continued)

*Primary Examiner* — Wayne Young
*Assistant Examiner* — James L Habermehl
(74) *Attorney, Agent, or Firm* — White & Case LLP

(57) ABSTRACT

According to one embodiment, a disc device outputs a first signal for canceling out a first disturbance at a predetermined frequency of a position error, outputs a second signal which gain or phase of the first signal are changed, and corrects an operation amount or the position error by using the second signal.

15 Claims, 4 Drawing Sheets

(56) References Cited

U.S. PATENT DOCUMENTS

| | | | | |
|---|---|---|---|---|
| 8,412,360 B2* | 4/2013 | Jia | ...................... | G11B 5/59622 360/77.02 |
| 8,488,268 B2* | 7/2013 | Atsumi | ................ | G11B 5/5582 360/77.02 |
| 8,537,485 B2* | 9/2013 | DeRosa | ............... | G11B 5/5582 360/75 |
| 8,773,808 B2* | 7/2014 | Iwashiro | ............ | G11B 5/59622 360/77.02 |
| 2006/0176604 A1 | 8/2006 | Atsumi et al. | | |
| 2010/0321819 A1 | 12/2010 | Atsumi | | |
| 2011/0141617 A1 | 6/2011 | Sudo | | |
| 2013/0194691 A1* | 8/2013 | Hara | ................... | G11B 5/5582 360/75 |

* cited by examiner

US 9,691,420 B2

DISC DEVICE, CONTROLLING DEVICE AND METHOD

CROSS-REFERENCE TO RELATED APPLICATIONS

This application is based upon and claims the benefit of priority from U.S. Provisional Application No. 62/043,191, filed on Aug. 28, 2014; the entire contents of which are incorporated herein by reference.

FIELD

Embodiments described herein relate generally to a disc device, a controlling device and a method.

BACKGROUND

To improve accuracy of positioning a head to a target position on the disc surface of a rotating disc, it is necessary to suppress non-repeatable run-outs (NRRO) such as disc flutters. The non-repeatable run-outs is disturbances erupting at a frequency that is asynchronous with rotation of the disc (hereinafter, referred to as suppression target frequency). As a method to suppress the non-repeatable run-outs, there is a method to add a filter for removing the non-repeatable run-outs (hereinafter, referred to as NRRO suppression filter) to a feedback system.

However, according to the method to add the NRRO suppression filter to the feedback system, the gain and phase of a sensitivity function at frequencies around the suppression target frequency do not coincide with the gain and phase of a sensitivity function without the NRRO suppression filter, whereby the accuracy of positioning the head may not be improved.

DETAILED DESCRIPTION

In general, according to one embodiment, a disc device is provided to include: a head for writing and reading data relative to a disc; an actuator to move the head over a disc surface of the disc; and a processor to include a comparison unit to determine a position error between a control position and a target position of the head to the disc surface; a controller to output to the actuator an operation amount for decreasing the position error; a first filter to output a first signal for canceling out a first disturbance at a predetermined frequency of the position error; a second filter to output a second signal which gain or phase of the first signal are changed; and a correction unit to correct the operation amount or the position error by using the second signal.

Exemplary embodiments of a disc device, a controlling device and a method will be explained below in detail with reference to the accompanying drawings. The present invention is not limited to the following embodiments.

First Embodiment

Figure 1:
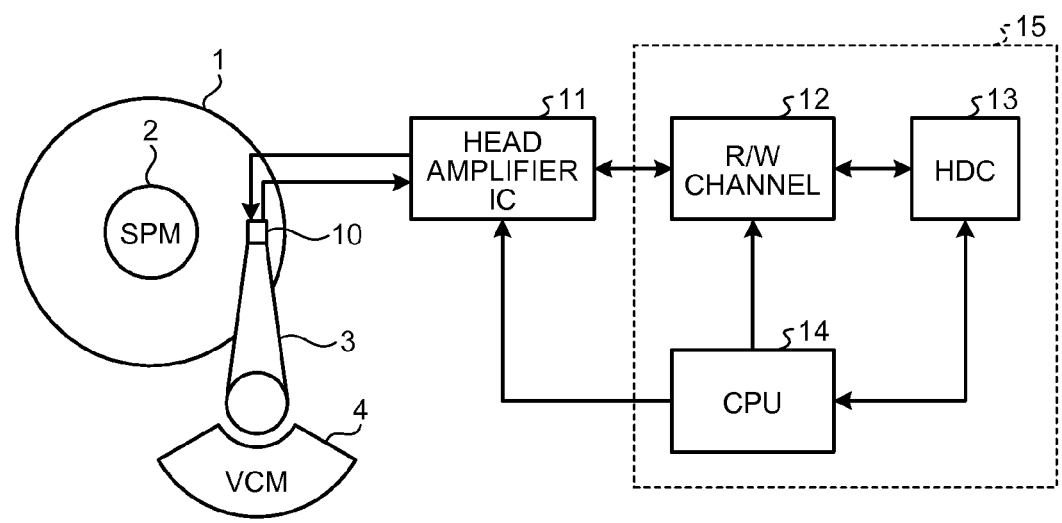
FIG. 1 is a block diagram illustrating one example of a hardware configuration of a disc drive according to a first embodiment.

FIG. 1 is a block diagram illustrating one example of a hardware configuration of a disc drive according to a first embodiment. As illustrated in FIG. 1, the disc drive according to the first embodiment (one example of a disc device) has a disc 1 composed of a recording medium in which data is recorded in a perpendicular magnetic recording system (so-called perpendicular magnetic recording medium) and the like, and a head 10 for recording data in the disc 1 in the perpendicular magnetic recording system or the like.

The disc 1 is fixed to a spindle motor 2 and configured to rotate. The head 10 is mounted on an actuator 3 and configured to be movable in a radial direction of a disc surface of the disc 1. The actuator 3 is rotated and driven by a voice coil motor (VCM) 4 and moves the head 10 over the disc surface of the disc 1. The head 10 has a write head for writing data into the disc 1 and a read head for reading data from the disc 1.

As illustrated in FIG. 1, the disc drive has a head amplifier integrated circuit (hereinafter, referred to as head amplifier IC) 11, a read/write channel (hereinafter, referred to as R/W channel) 12, a hard disc controller (HDC) 13, and a central processing unit (CPU) 14 as one example of a processor. In the embodiment, the R/W channel 12, the HDC 13, and the CPU 14 are incorporated into a one-chip integrated circuit 15.

The head amplifier IC 11 flows to the head 10 a write signal (current) according to write data input from the R/W channel 12. The head amplifier IC 11 amplifies a read signal output from the head 10 (data read from the disc 1 by the head 10), and transmits the same to the R/W channel 12.

The R/W channel 12 is a signal processing circuit. In the embodiment, the R/W channel 12 encodes (code-modulates) the write data input from the HDC 13, and outputs the same to the head amplifier IC 11. The R/W channel 12 also decodes (code-demodulates) read data from the read signal transmitted from the head amplifier IC 11, and outputs the same to the HDC 13.

The HDC 13 is a communication interface that makes the disc drive be communicable with a host system not illustrated (for example, a personal computer or the like). Specifically, the HDC 13 exchanges the write data and the read data with the host system not illustrated.

The CPU 14 is a main controller of the disc drive, and executes various control processes such as a control process for reading or writing by the head 10, a servo control process for controlling the position of the head 10 over the disc surface of the disc 1, and the like. The CPU 14 executes the various control processes by reading and executing programs stored in a storage medium such as a read only memory (ROM).

Figure 2:
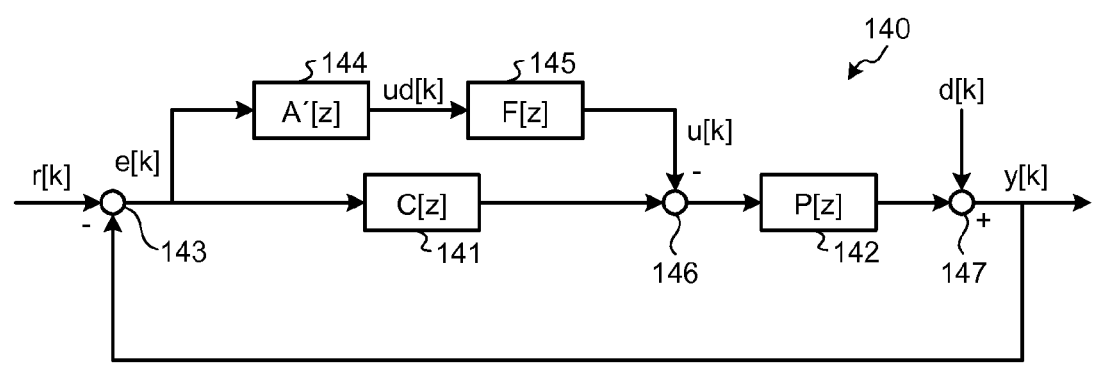
FIG. 2 is a diagram illustrating one example of a functional configuration of the disc drive according to the first embodiment.

FIG. 2 is a diagram illustrating one example of a functional configuration of the disc drive according to the first embodiment. As illustrated in FIG. 2, the disc drive according to the embodiment has a feedback system 140 that controls, by feedback control, the position of the head 10 at execution of the servo control process.

As illustrated in FIG. 2, the feedback system 140 has a controller 141, a plant 142, a comparison unit 143, an NRRO suppression filter 144 (one example of a first filter), a matching filter 145 (one example of a second filter), a subtraction unit 146, and an addition unit 147.

The comparison unit 143 determines a position error e[k] which is a difference between a control position y[k] and a target position r[k] of the head 10 over the disc surface of the disc 1. In the embodiment, the comparison unit 143 determines the position error e[k] by subtracting the control position y[k] of the head 10 from the target position r[k] according to a command input via the HDC 13 from a host system not illustrated or the like.

The controller 141 is implemented by the CPU 14 and expressed as a transfer function C[z]. The controller 141 receives input of the position error e[k] from the comparison unit 143, and outputs to the plant 142 (actuator 3) an operation amount for canceling out the input position error e[k]. The plant 142 is the actuator 3 as one example of a control target, and is expressed as a transfer function P[z]. The plant 142 is rotated and driven according to the operation amount output from the controller 141 and makes the head 10 move on the disc surface of the disc 1 (one example of a control target).

The NRRO suppression filter 144 estimates an non-repeatable run-out (NRRO) disturbance d[k] (one example of a first disturbance) which is a disturbance of a suppression target frequency $\omega_0$ (one example of a predetermined frequency) asynchronous with rotation of the disc 1 (one example of a motion cycle). Then, the NRRO suppression filter 144 outputs an estimated disturbance signal ud[k] as one example of a first signal for cancelling out the estimated NRRO disturbance d[k]. In the embodiment, the NRRO suppression filter 144 is configured to output the estimated disturbance signal ud[k] for cancelling out the NRRO disturbance d[k]. However, the NRRO suppression filter 144 is not limited to this configuration as far as it outputs the estimated disturbance signal ud[k] for cancelling out a disturbance at a predetermined frequency included in the position error e[k] determined by the comparison unit 143. For example, the NRRO suppression filter 144 may be configured to output the estimated disturbance signal ud[k] for cancelling out a disturbance at a predetermined frequency synchronous with rotation of the disc 1 included in the position error e[k] determined by the comparison unit 143, for example.

In the embodiment, the NRRO suppression filter 144 is expressed as a transfer function A'[z] that does not take into account a gain $\alpha$ and a phase $\phi$ at the suppression target frequency $\omega_0$ in a transfer function Tud (hereinafter, referred to as first transfer function) from an NRRO suppression signal u[k] described later to addition of the NRRO disturbance d[k], as indicated in the following equation (1). In other words, the NRRO suppression filter 144 is expressed as the transfer function A'[z] in which the gain $\alpha$ and the phase $\phi$ are eliminated from the transfer function A[z] taking into account the gain $\alpha$ and the phase $\phi$ at the suppression target frequency $\omega_0$ in the first transfer function Tud[z], as indicated in the following equation (2). That is, the NRRO suppression filter 144 is expressed as the transfer function A'[z] in which the gain $\alpha$ in the transfer function A[z] is 1 and the phase $\phi$ in the transfer function A[z] is 0 as follows:

$$A'[z] = \mu_0 \frac{z^2 - \eta z \cos\omega_0 T}{z^2 - 2\eta z \cos\omega_0 T + \eta^2} \quad (1)$$

$$A[z] = \frac{\mu_0}{\alpha} \frac{z^2 \cos\phi - \eta z \cos(\omega_0 T + \phi)}{z^2 - 2\eta z \cos\omega_0 T + \eta^2}$$

$$\alpha = \left| \frac{P[z]}{1 + P[z]C(z)} \right|_{z=e^{j\omega_0 T}}$$

$$\phi = \arg\left( \frac{P[z]}{1 + P[z]C(z)} \right)\bigg|_{z=e^{j\omega_0 T}}$$

$$T_{ud}[z] = \frac{P[z]}{1 + P[z]C(z)} \quad (2)$$

where $\mu_0$ and $\eta$ denote arbitrary constants, and T denotes a sampling period.

The matching filter 145 outputs the NRRO suppression signal u[k] that is one example of a second signal in which the gain and phase of the estimated disturbance signal ud[k] are changed. In the embodiment, the matching filter 145 is expressed as a transfer function (hereinafter, referred to as second transfer function) in which the gain and phase of the estimated disturbance signal ud[k] are changed by the gain and phase of inverse characteristics of the first transfer function Tud[z]. That is, the matching filter 145 cancels changes in the gain and phase of the NRRO suppression signal u[k] by the gain $\alpha$ and the phase $\phi$ in the first transfer function Tud[z] before addition of the NRRO disturbance d[k].

In the embodiment, the matching filter 145 is connected in series with the NRRO suppression filter 144. The matching filter 145 is expressed as the second transfer function F[z] which has inverse characteristics of the first transfer function Tud[z], as indicated in the following equation (3):

$$F[z] = \frac{1 + P[z]C[z]}{P[z]} \quad (3)$$

According to circumstances, there is a case where the matching filter 145 is not expressible as the second transfer function F[z] indicated in the equation (3). In such cases, the matching filter 145 outputs the NRRO suppression signal u[k] in which the gain and phase of the estimated disturbance signal ud[k] at a frequency within a predetermined range from the suppression target frequency $\omega_0$ are changed to coincide with the gain and phase in the second transfer function F[z]. The predetermined range here is a range of frequencies at which fluctuations in a sensitivity function are to be reduced with reference to the suppression target frequency $\omega_0$. In the embodiment, the predetermined range is frequencies near the suppression target frequency $\omega_0$.

For example, assuming that the predetermined range is $\omega_1 \leq \omega \leq \omega_2$, the matching filter 145 is expressed as a second transfer function $F[e^{j\omega T}]$ with inverse characteristics of the first transfer function Tud[z] in the predetermined range, as indicated in the following equation (4):

$$F[e^{j\omega T}] \simeq \frac{1 + P[e^{j\omega T}]C[e^{j\omega T}]}{P[e^{j\omega T}]}, \quad \omega_1 \leq \omega \leq \omega_2 \quad (4)$$

The subtraction unit 146 is one example of a correction unit that corrects the operation amount output from the controller 141, based on the NRRO suppression signal u[k] output from the matching filter 145. In the embodiment, the subtraction unit 146 subtracts the NRRO suppression signal u[k] output from the matching filter 145, from the operation amount output from the controller 141. Accordingly, even if the NRRO disturbance d[k] is included in the control position y[k] of the head 10 at the addition unit 147, it is possible to suppress the NRRO disturbance d[k] included in the control position y[k]. This allows improvement in the positioning accuracy of the head 10 at execution of the servo control process.

Next, descriptions will be given as to influence on the sensitivity function in the feedback system by occurrence of an error between the gain or phase of the matching filter 145 and the gain α or phase φ (for example, the gain α is 1 and the phase φ is 0) of inverse characteristics of the first transfer function Tud[z] (hereinafter, referred to as matching error).

First, a sensitivity function S[z] in a feedback system (hereinafter, referred to as first reference feedback system) in which the matching filter 145 is eliminated from the feedback system 140 illustrated in FIG. 2 and the matching effect only with the suppression target frequency $\omega_0$ is included in the NRRO suppression filter 144 is expressed by the following equation (5). The sensitivity function S[z] includes L[z] that is a loop transfer function as indicated in the following equation (5):

$$L[z] = P[z](C[z] + A[z]) \tag{5}$$

$$S[z] = \frac{1}{1+L[z]}$$

$$= \frac{1}{1+P[z]C[z]} \frac{1}{1+\frac{P[z]}{1+P[z]C[z]}A[z]}$$

where A[z] is formed by including the matching effect only with the suppression target frequency $\omega_0$ in the transfer function A'[z] of the NRRO suppression filter 144 as described above.

As indicated in the equation (5), the sensitivity function S[z] in the first reference feedback system is formed by multiplying the sensitivity function (1/(1+P[z]C[z])) in a feedback system (hereinafter, referred to as second reference feedback system) without the NRRO suppression filter 144 and the matching filter 145 by the influence term (1/(1+(P[z]/(1+P[z]C[z]))A[z]) as a term in the NRRO suppression filter 144. The influence term here is a term that takes into account the influence of the NRRO suppression filter 144 on the sensitivity function S[z] at the suppression target frequency $\omega_0$ and frequencies around the suppression target frequency $\omega_0$. The influence term includes B[z] as (P[z]/(1+P[z]C[z]))A[z] that is expressed by the following equation (6):

$$\frac{P[z]}{1+P[z]C[z]}A[z] = \frac{P[z]}{1+P[z]C[z]} \frac{\mu_0}{\alpha} \frac{z^2\cos\phi - \eta z\cos(\omega_0 T + \phi)}{z^2 - 2\eta z\cos\omega_0 T + \eta^2} \tag{6}$$

$$= \mu_0 \beta[z] \frac{z^2\cos\psi[z] - \eta z\cos(\omega_0 T + \psi[z])}{z^2 - 2\eta z\cos\omega_0 T + \eta^2} =: B[z]$$

$$\beta[z] = \frac{P[z]}{1+P[z]C[z]} \left|\frac{1+P[z]C[z]}{P[z]}\right|_{z=e^{j\omega_0 T}}$$

$$\psi[z] = \arg\left(\frac{P[z]}{1+P[z]C[z]}\right)_{z=e^{j\omega_0 T}} - \arg\left(\frac{P[z]}{1+P[z]C[z]}\right)$$

where β[z] denotes the ratio (hereinafter, referred to as matching error ratio) of a matching error of gain of the matching filter 145 with reference to the gain α=1 of inverse characteristic of the first transfer function Tud[z], and ψ[z] denotes a matching error of phase of the matching filter 145 with reference to the phase φ=0 of inverse characteristic of the first transfer function Tud[z].

Figure 3A:
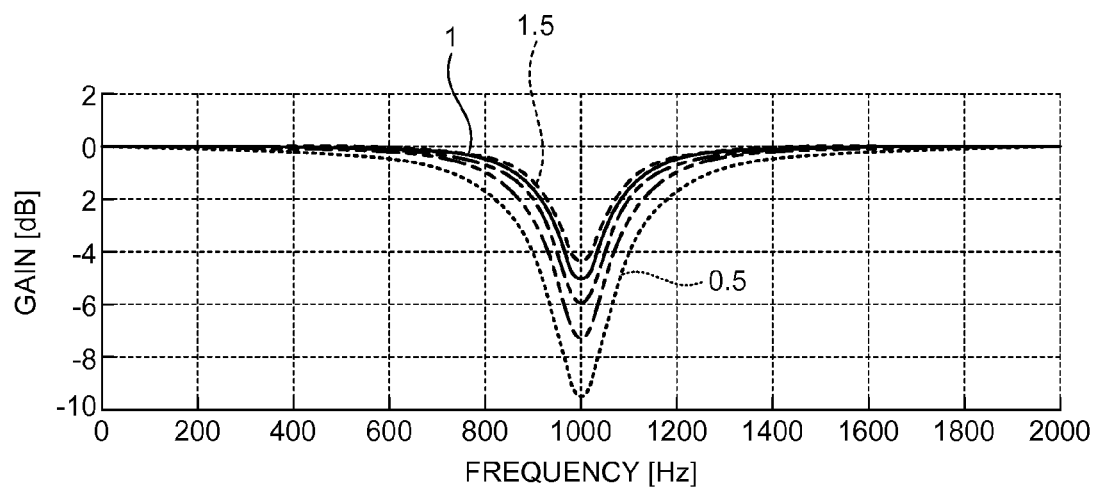
FIGS. 3A and 3B are diagrams illustrating examples of $1/(1+B[z])$ with changes in matching error ratio $\beta\,[z]$.
Figure 3B:
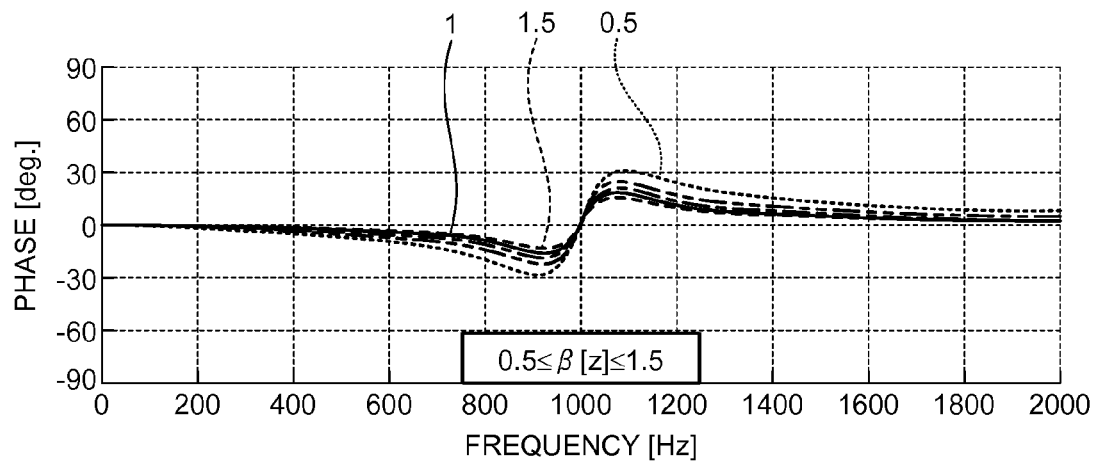

FIGS. 3A and 3B are diagrams illustrating examples of 1/(1+B[z]) with changes in the matching error ratio β[z]. In FIG. 3A, the vertical axis indicates a gain in an influence term and the horizontal axis indicates a frequency. In FIG. 3B, the vertical axis indicates a phase of the influence term and the horizontal axis indicates a frequency. The influence term is configured such that, when the matching error ratio β[z] changes from 0.5 to 1.5 as illustrated in FIG. 3A, fluctuations in the phase of the influence term increase with reference to the phase of the influence term with the matching error ratio β[z] of 1, at frequencies (for example, 800 Hz and 1200 Hz) around the suppression target frequency $\omega_0$ (for example, 1000 Hz), as illustrated in FIG. 3B. This exerts a larger influence on the sensitivity function S[z].

Figure 4A:
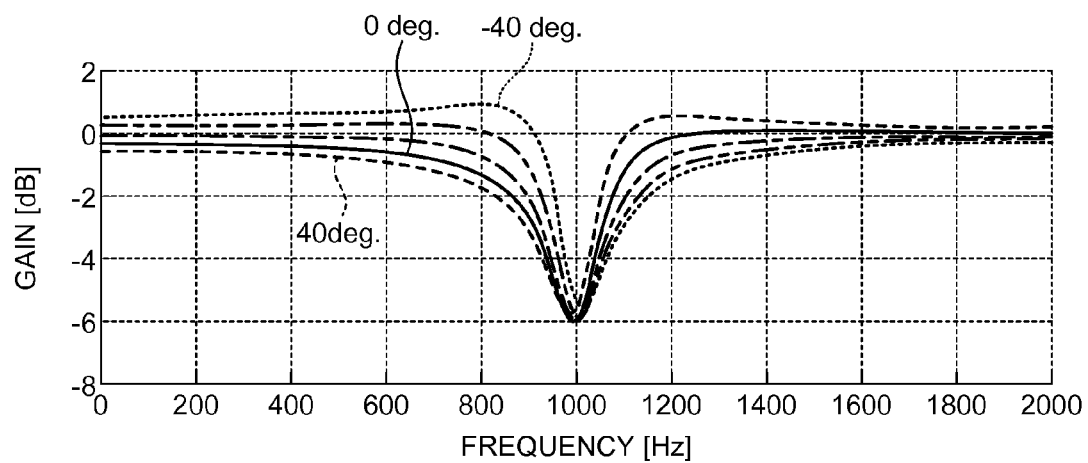
FIGS. 4A and 4B are diagrams illustrating examples of $1/(1+B[z])$ with changes in matching error $\psi\,[z]$.
Figure 4B:
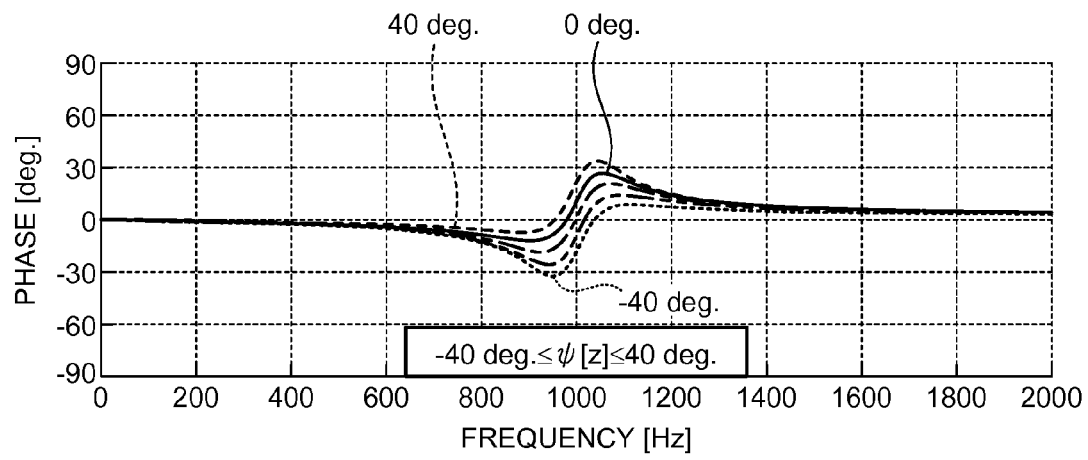

FIGS. 4A and 4B are diagrams illustrating examples of 1/(1+B[z]) with changes in the matching error ψ[z]. In FIG. 4A, the vertical axis indicates a gain in an influence term and the horizontal axis indicates a frequency. In FIG. 4B, the vertical axis indicates a phase of the influence term and the horizontal axis indicates a frequency. The influence term is configured such that, when the matching error ψ[z] changes from −40 to 40 degrees as illustrated in FIG. 4B, fluctuations in the gain of the influence term increase with reference to the gain of the influence term with the matching error ψ[z] of 0 degree, at frequencies (for example, 800 Hz and 1200 Hz) around the suppression target frequency $\omega_0$ (for example, 1000 Hz), as illustrated in FIG. 4A. This exerts a larger influence on the sensitivity function S[z].

Meanwhile, according to the feedback system 140 illustrated in FIG. 2, fluctuations in the sensitivity function of the feedback system 140 can be suppressed by decreasing the matching error with the use of the matching filter 145. This further improves the positioning accuracy of the head 10 at execution of the servo control process.

Accordingly, it is possible to prevent that fluctuations in the sensitivity function at frequencies around the suppression target frequency $\omega_0$ of the feedback system 140 using the NRRO suppression filter 144 and the matching filter 145 increase with reference to the sensitivity function of the feedback system not using the NRRO suppression filter 144 and the matching filter 145. This further improves the positioning accuracy of the head 10 at execution of the servo control process. The fluctuations in the sensitivity function here refer to the situation in which the gain and phase of the sensitivity function in the feedback system 140 using the NRRO suppression filter 144 and the matching filter 145 do not coincide with the gain and phase of the sensitivity function in the feedback system not using the NRRO suppression filter 144 and the matching filter 145.

Figure 5A:
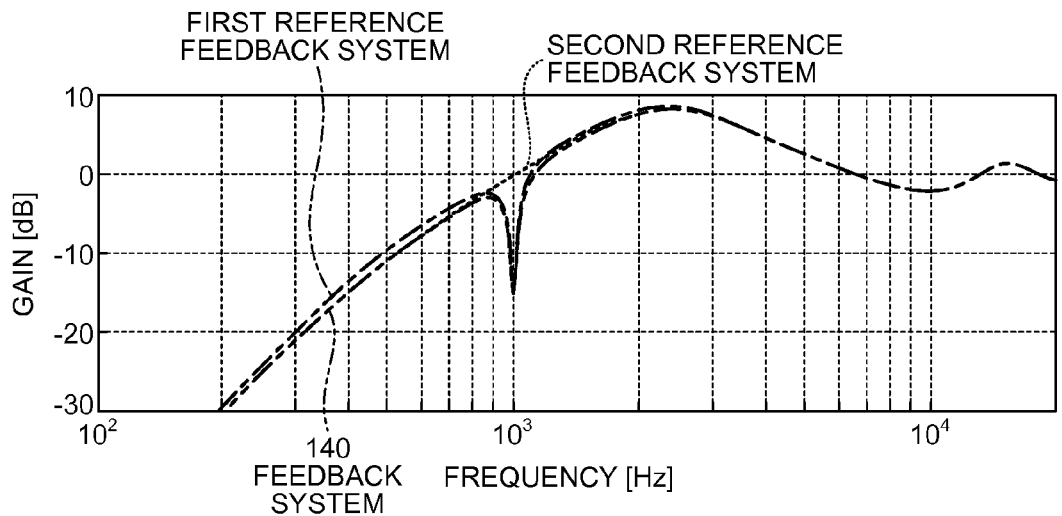
FIGS. 5A and 5B are diagrams illustrating examples of a sensitivity function in a feedback system of the disc drive according to the first embodiment.
Figure 5B:
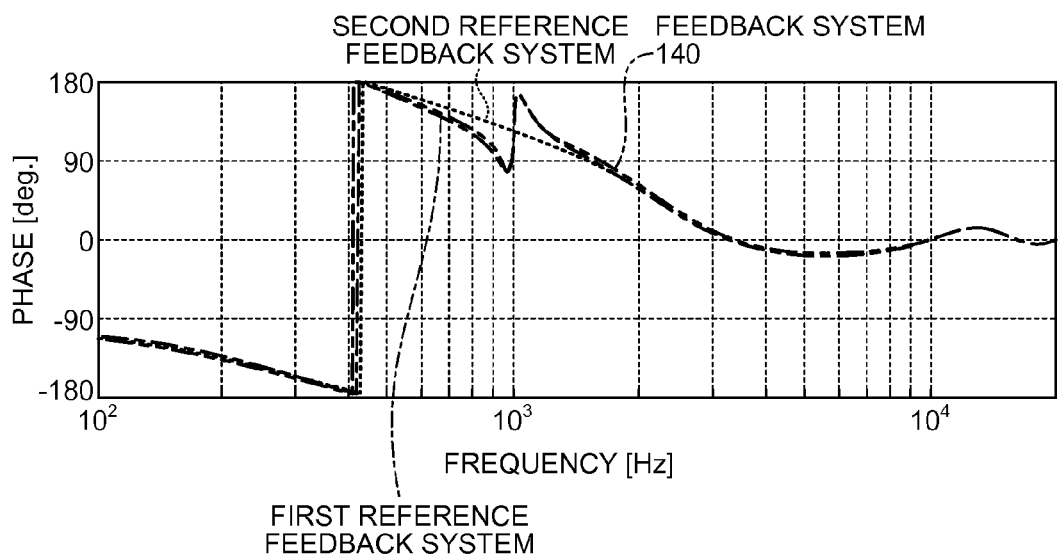

FIGS. 5A and 5B are diagrams illustrating examples of a sensitivity function in a feedback system of the disc drive according to the first embodiment. In FIG. 5A, the vertical axis indicates a gain of the sensitivity function and the horizontal axis indicates a frequency. In FIG. 5B, the vertical axis indicates a phase of the sensitivity function and the horizontal axis indicates a frequency. The gain and phase of the sensitivity function in the first reference feedback system are smaller than the gain and phase of the sensitivity function in the second reference feedback system at the suppression target frequency $\omega_0$ (for example, 1000 Hz), as illustrated in FIGS. 5A and 5B. However, the sensitivity function in the first reference feedback system has fluctuations at frequencies around the suppression target frequency $\omega_0$ (for example, 200 to 2000 Hz) relative to the sensitivity function in the second reference feedback system, as illustrated in FIGS. 5A and 5B.

As compared to this, the sensitivity function in the feedback system 140 has fluctuations decreased at frequencies around the suppression target frequency $\omega_0$ relative to the sensitivity function in the second reference feedback system, as illustrated in FIGS. 5A and 5B. This further improves the positioning accuracy of the head 10 at execution of the servo control process.

According to the first embodiment, the gain and phase of the estimated disturbance signal ud[k] are changed by the gain and phase of inverse characteristics of the first transfer function Tud[z]. As a result, it is possible to obtain the advantage of further improving the positioning accuracy of the head 10 at execution of the servo control process.

Second Embodiment

A second embodiment is an example of correcting the position error e[k] by using the NRRO suppression signal u[k] output from the matching filter 145. Hereinafter, descriptions of the similar configurations as those in the first embodiment will be omitted.

Figure 6:
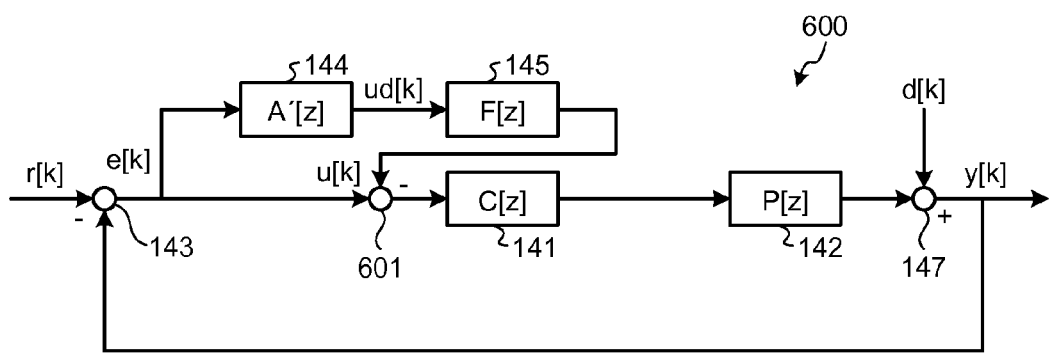
FIG. 6 is a diagram illustrating one example of a functional configuration of a disc drive according to a second embodiment.

FIG. 6 is a diagram illustrating one example of a functional configuration of a disc drive according to the second embodiment. A feedback system 600 of the disc drive according to the embodiment has a subtractor 601 as one example of a correction unit that corrects the position error e[k] output from the comparison unit 143 based on the NRRO suppression signal u[k] output from the matching filter 145, as illustrated in FIG. 6.

In the embodiment, the subtractor 601 subtracts the NRRO suppression signal u[k] output from the matching filter 145, from the position error e[k] output from the comparison unit 143. Accordingly, even if the NRRO disturbance d[k] is included in the control position y[k] of the head 10, it is possible to suppress the NRRO disturbance d[k] included in the control position y[k]. This improves the accuracy of servo control of the head 10.

The matching filter 145 also changes the gain and phase of the estimated disturbance signal ud[k] by the gain and phase of inverse characteristics of the first transfer function Tud[z]. Accordingly, a matching error becomes smaller, which makes it possible to prevent that fluctuations in the sensitivity function at frequencies around the suppression target frequency $\omega_0$ in the case of using the NRRO suppression filter 144 and the matching filter 145 become larger with reference to the sensitivity function in the second reference feedback system. This further improves the positioning accuracy of the head 10 at execution of the servo control process.

In the second embodiment, the matching filter 145 is also expressed as the second transfer function F[z] with inverse characteristics of the first transfer function Tud[z], as indicated in the following equation (7):

$$F[z] = \frac{1 + P[z]C[z]}{P[z]C[z]} \quad (7)$$

According to the second embodiment, the position error e[k] can be corrected by using the NRRO suppression signal u[k] output from the matching filter 145. As a result, the same advantage as that in the first embodiment can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disc device comprising:
   a head for writing and reading data relative to a disc;
   an actuator to move the head over a disc surface of the disc; and
   a processor to include
      a comparison unit to determine a position error between a control position and a target position of the head to the disc surface;
      a controller to output to the actuator an operation amount for decreasing the position error;
      a first filter to output a first signal for canceling out a first disturbance at a predetermined frequency of the position error;
      a second filter to output a second signal which gain or phase of the first signal are changed and being expressed as a second transfer function in which the gain or phase of the first signal are changed by gain or phase of inverse characteristics of a first transfer function including the first disturbance; and
      a correction unit to correct the operation amount or the position error by using the second signal.

2. The disc device of claim 1, wherein the second filter changes the gain or phase of the first signal by the gain or phase of inverse characteristics of the first transfer function, at frequencies within a predetermined range with reference to the predetermined frequency.

3. The disc device of claim 2, wherein the first filter is expressed as a transfer function A'[z] indicated in the following equation:

$$A'[z] = \mu_0 \frac{z^2 - \eta z \cos\omega_0 T}{z^2 - 2\eta z \cos\omega_0 T + \eta^2}$$

where $\mu 0$ and $\eta$ denote arbitrary constants, $\omega_0$ denotes the predetermined frequency, and T denotes a sampling period.

4. The disc device of claim 3, wherein the second transfer function is expressed by the following equation:

$$F[z] = \frac{1 + P[z]C[z]}{P[z]}$$

where P[z] denotes a transfer function of the actuator, and C[z] denotes a transfer function of the controller.

5. The disc device of claim 3, wherein the second transfer function is expressed by the following equation:

$$F[e^{j\omega T}] \cong \frac{1 + P[e^{j\omega T}]C[e^{j\omega T}]}{P[e^{j\omega T}]}, \quad \omega_1 \leq \omega \leq \omega_2$$

where P[$e^{j\omega T}$] denotes a transfer function of the actuator, C[$e^{j\omega T}$] denotes a transfer function of the controller, $\omega_1$ denotes a frequency as lower limit of the predetermined range, and $\omega_2$ denotes a frequency as upper limit of the predetermined range.

6. A controlling device comprising:
   a processor to include;
   a comparison unit to determine a position error between a control position and a target position of a control target;
   a controller to output to the control target an operation amount for decreasing the position error;
   a first filter to output a first signal for canceling out a first disturbance at a predetermined frequency of the position error;
   a second filter to output a second signal which gain or phase of the first signal are changed and to being expressed as a second transfer function in which the gain or phase of the first signal are changed by gain or phase of inverse characteristics of a first transfer function including the first disturbance; and
   a correction unit to correct the operation amount or the position error by using the second signal.

7. The controlling device of claim 6, wherein the second filter changes the gain or phase of the first signal by the gain or phase of inverse characteristics of the first transfer function, at frequencies within a predetermined range with reference to the predetermined frequency.

8. The controlling device of claim 7, wherein the first filter is expressed as a transfer function A'[z] indicated in the following equation:

$$A'[z] = \mu_0 \frac{z^2 - \eta z \cos\omega_0 T}{z^2 - 2\eta z \cos\omega_0 T + \eta^2}$$

where µ0 and η denote arbitrary constants, $\omega_0$ denotes the predetermined frequency, and T denotes a sampling period.

9. The controlling device of claim 8, wherein the second transfer function is expressed by the following equation:

$$F[z] = \frac{1 + P[z]C[z]}{P[z]}$$

where P[z] denotes a transfer function of the control target, and C[z] denotes a transfer function of the controller.

10. The controlling device of claim 8, wherein the second transfer function is expressed by the following equation:

$$F[e^{j\omega T}] \cong \frac{1 + P[e^{j\omega T}]C[e^{j\omega T}]}{P[e^{j\omega T}]}, \omega_1 \leq \omega \leq \omega_2$$

where P[$e^{j\omega T}$] denotes a transfer function of the control target, C[$e^{j\omega T}$] denotes a transfer function of the controller, $\omega_1$ denotes a frequency as lower limit of the predetermined range, and $\omega_2$ denotes a frequency as upper limit of the predetermined range.

11. A method comprising:
   determining a position error between a control position and target position of a control target;
   outputting to the control target an operation amount for decreasing the position error;
   outputting a first signal for canceling out a first disturbance at a predetermined frequency of the position error;
   outputting a second signal which gain or phase of the first signal are changed, the changing being expressed as a second transfer function in which the gain or phase of the first signal are changed by gain or phase of inverse characteristics of a first transfer function including the first disturbance; and
   correcting the operation amount or the position error by using the second signal.

12. The method of claim 11, wherein the changing changes the gain or phase of the first signal by the gain or phase of inverse characteristics of the first transfer function, at frequencies within a predetermined range with reference to the predetermined frequency.

13. The method of claim 12, wherein the estimating is expressed as a transfer function A'[z] indicated in the following equation:

$$A'[z] = \mu_0 \frac{z^2 - \eta z \cos\omega_0 T}{z^2 - 2\eta z \cos\omega_0 T + \eta^2}$$

where µ0 and η denote arbitrary constants, $\omega_0$ denotes the predetermined frequency, and T denotes a sampling period.

14. The method of claim 13, wherein the second transfer function is expressed by the following equation:

$$F[z] = \frac{1 + P[z]C[z]}{P[z]}$$

where P[z] denotes a transfer function of the control target, and C[z] denotes a transfer function of the controlling.

15. The method of claim 13, wherein the second transfer function is expressed by the following equation:

$$F[e^{j\omega T}] \cong \frac{1 + P[e^{j\omega T}]C[e^{j\omega T}]}{P[e^{j\omega T}]}, \omega_1 \leq \omega \leq \omega_2$$

where P[$e^{j\omega T}$] denotes a transfer function of the control target, C[$e^{j\omega T}$] denotes a transfer function of the controlling, $\omega_1$ denotes a frequency as lower limit of the predetermined range, and $\omega_2$ denotes a frequency as upper limit of the predetermined range.

* * * * *